United States Patent
Breen et al.

(10) Patent No.: US 6,790,420 B2
(45) Date of Patent: Sep. 14, 2004

(54) CONTROL OF MERCURY AND OTHER ELEMENTAL METAL EMISSIONS FROM COMBUSTION DEVICES BY OXIDATION

(75) Inventors: Bernard P. Breen, Pittsburgh, PA (US); James E. Gabrielson, Hanover, MN (US)

(73) Assignee: Breen Energy Solutions, LLC, Pittsburgh, PA (US)

( * ) Notice: Subject to any disclaimer, the term of this patent is extended or adjusted under 35 U.S.C. 154(b) by 167 days.

(21) Appl. No.: 10/072,341

(22) Filed: Feb. 7, 2002

(65) Prior Publication Data

US 2003/0147793 A1 Aug. 7, 2003

(51) Int. Cl.[7] ............................................. B01D 53/64
(52) U.S. Cl. .................................... 423/215.5; 423/210
(58) Field of Search .............................. 110/203, 216, 110/345; 423/210, 215.5, 235

(56) References Cited

U.S. PATENT DOCUMENTS

| | | | |
|---|---|---|---|
| 5,443,805 A | | 8/1995 | Beer et al. |
| 5,670,122 A | | 9/1997 | Zamansky et al. |
| 6,136,281 A | * | 10/2000 | Meischen et al. ........... 423/210 |
| 6,146,605 A | * | 11/2000 | Spokoyny ................ 423/239.1 |
| 6,258,336 B1 | | 7/2001 | Breen et al. |
| 6,357,367 B1 | * | 3/2002 | Breen et al. ................ 110/345 |

FOREIGN PATENT DOCUMENTS

| | | |
|---|---|---|
| EP | 0 860 197 A | 8/1998 |
| WO | WO 93 23147 | 11/1993 |

OTHER PUBLICATIONS

Patent Abstracts of Japan, vol. 1998, No. 2, Publication No. 10 180038 A (Babcock Hitachi KK).
Chemical Reactions of Mercury in Combustion Flue Gas, Hall et al., *Water, Air and Soil Pollution*, Vo. 56, 1991, pp. 3–14.

* cited by examiner

*Primary Examiner*—Stanley S. Silverman
*Assistant Examiner*—Maribel Medina
(74) *Attorney, Agent, or Firm*—Buchanan Ingersoll, P.C.

(57) ABSTRACT

In a method of removing metals such as mercury from flue gas produced by combustion devices, ammonia and optionally carbon monoxide are injected into the flue gas in a manner so that there are sufficient amounts of these materials in the flue gas when the flue gas is at a temperature of from 900° F. to 1350° F. to oxidize the metals within the flue gas. The oxidized metals are then attracted to particulates present in the flue gas. These particulates bound with oxidized metals are removed from the flue gas by a particulate removal device such as an electrostatic precipitator or baghouse.

16 Claims, 4 Drawing Sheets

CO Conc. effect on the Chlorine radical existenc
Flue gas composition: CO2: 0.1444, H2O: 0.0569, O2: 0.0386, N2: 0.7659, HC1 62ppm Chlorine content in coal effect on the chlorine radical existence at 933K Flue gas composition: CO2: 0.1444, H2O: 0.0569, O2: 0.0386, N2: 0.7659, HCl various Moisture content in flue gas effect on the chlorine radical existence at 933K Flue gas composition: CO2: 0.1444, O2: 0.0386, N2: various, HCl 62ppm NH3 injection effect on the Atomic
Chlorine existence CO Conc. effect on the Chlorine
radical existenc Flue gas composition: CO2: 0.1444, H2O: 0.0569,
O2: 0.0386, N2: 0.7659, HC1 62ppm CO local Conc. in the SNCR injection zone effect on the Atomic Chlorine existence NO Conc. Effect on the Chlorine radical existence
Flue gas composition: CO2: 0.1444, H2O: 0.0569,
O2: 0.0386, N2: 0.7659, HC1 62ppm

CONTROL OF MERCURY AND OTHER ELEMENTAL METAL EMISSIONS FROM COMBUSTION DEVICES BY OXIDATION

FIELD OF INVENTION

The invention relates to a method for removing mercury and other elemental metals from emissions from combustion devices.

BACKGROUND OF THE INVENTION

Much work has been done to remove pollutants from emissions from coal fired furnaces. The focus of most of these efforts has been toward the removal of particulates, $NO_x$ and $SO_x$ from flue gas. Commercially available techniques for reducing nitrogen oxide emissions in furnace flue gases include low-$NO_x$ burners, overfire air, selective non-catalytic $NO_x$ reduction (SNCR), selective catalytic reduction (SCR), and reburning.

Reburning is a technique whereby a fraction of the total thermal input to the furnace is injected above the primary combustion zone to create a fuel rich zone. Hydrocarbon fuels such as coal, oil, or gas are more effective $NO_x$ reducers than non-carbon containing fuels such as hydrogen or non-hydrogen containing fuels such as carbon monoxide. Stoichiometry of about 0.90 (10% excess fuel) in the reburn zone is considered optimum for $NO_x$ control. Thus, it is apparent that the amount of reburn fuel required for effective $NO_x$ control is directly related to the stoichiometry of the primary combustion zone and, in particular, the amount of excess air therein. Under typical furnace conditions, a reburn fuel input of over 10% of the total fuel input to the furnace is usually sufficient to form a fuel-rich reburn zone. The reburn fuel is injected at high temperatures in order to promote reactions under the overall fuel-rich stoichiometry. Typical flue gas temperatures at the injection point are above 1700K (2600° F.). Overfire air is introduced into the flue gases downstream of the fuel-rich reburn zone in order to complete combustion of any unburned hydrocarbons and carbon monoxide (CO) remaining in the flue gases leaving the fuel-rich reburn zone. In addition, it is also known that rapid and complete dispersion of the reburn fuel in the flue gases is beneficial. Thus, the injection of reburn fuel is frequently accompanied by the injection of a carrier fluid, such as recirculated flue gases, for the purpose of promoting mixing. To the extent that the recirculated flue gas contains oxygen, the amount of reburn fuel must be increased.

U.S. Pat. No. 5,443,805 teaches injection of an additive such as ammonia with a small amount of hydrocarbon, preferably methane or natural gas, into flue gases at a temperature in the range of about 1228K to 1422K (1750° F. to 2100° F.)., and preferably 1355K to 1338K (1800° F. to 1950° F.)., for reducing pollutants such as $NO_x$ therein. Hydrocarbon is injected for the purpose of enhancing the $NO_x$ reduction efficiency of the ammonia additive in the temperature range of about 978K to about 1422K (1300° F. to 2100° F.). There is a similar teaching in U.S. Pat. No. 6,258,336. That patent also teaches that other nitrogenous compounds such as amines, urea, cyanuric acid and mixtures thereof can be injected with a hydrocarbon fuel downstream of the primary combustion zone.

While the art has focused primarily on the removal of $NO_x$ and $SO_x$ from flue gas, there are also concerns about emissions of mercury and other elemental metals such as chromium, arsenic and lead from combustion devices. Mercury (Hg), the eightieth element, is an important pollutant. As a vapor it is a poison of the nervous system. It is the dire consequences of chronic mercury poisoning which gave birth to the term "Mad as a hatter." Hatters that used mercury to block the hats were exposed to toxic levels of mercury vapor. The tremors, shakes, stutters, and stammers common to mercury poisoning were endemic in the trade. Neither were astronomers, who frequently used telescopes which were floated on mercury, immune from this disease. It was at times fatal and has the characteristic of being cumulative over years of exposure, as the body's nervous system has difficulty in purging this element. Most industrial uses of mercury today are carefully controlled. The biggest sources of environmental mercury are coal combustion and the combustion of municipal solid waste. Coal and especially municipal solid waste compositions may also result in emissions containing chromium, arsenic and lead.

Mercury vapor is a poison. At the levels common in the atmosphere the concentrations are usually safe. However, the mercury accumulates in lakes where it is further accumulated in fish. These fish, with organic mercury molecules in them, can be hazardous to individuals who eat them. Some states request that people eat fish from some lakes no more frequently that once a week. Often it is stated that pregnant women and small children should eat no such fish.

Several states and the United States Environmental Protection Agency will soon limit the emissions of mercury and possibly other elemental metals from combustion devices. A method for controlling emissions of mercury and other metals is needed. Some control is possible by using particulate collection devices. However, only very expensive baghouses (fabric filters) are efficient enough to reduce the mercury to levels that may be required and still it is possible for the elemental mercury vapor to escape as a gaseous vapor molecule.

Activated carbon and other fine particulates are used to absorb mercury. Special treatment of the activated carbon has been tested. Collection by the use of activated carbon is very expensive. So, it is seen that a new method of removing mercury from flue gas is needed.

SUMMARY OF THE INVENTION

Mercury is emitted in power plant flue gases because the elemental form has a relatively high vapor pressure at usual stack flue gas temperature conditions. As such, the elemental mercury is emitted as a vaporous gas, Hg(v), which is very difficult to separate or filter; whereas if the mercury is oxidized it is no longer an elemental vapor. Moreover, the oxidized form exhibits a much lower vapor pressure and tends to collect or adsorb into surfaces of flyash particles within the flue gas. Those flyash particles are largely collected before the stack gas escapes. We have found that mercury can be oxidized to mercury chloride in the presence of background chlorine gas or hydrochloric acid gas when ammonia or ammonia precursor's are made available in the flue gas and when the temperature of the flue gas is in the range of 1005K down to 755K (1,350° F. down to 900° F.). When oxidized the mercury is absorbed by particulates in the flue gas and removed with the particulates.

Mercury does not oxidize to stable concentrations of mercury chloride at temperatures above 1005K (1,350° F.); while at temperatures below 755K (900° F.) the rate of oxidation effectively ceases. In this temperature range (1,005K down to 755K), the rate of oxidation is increased by free chlorine radical (Cl) concentration, which becomes very limited in the presence of free hydrogen (H) radical concentration. The presence of increased water ($H_2O$) thus limits the concentration of free chlorine radical in this temperature range and thereby tends to increase elemental mercury emissions; whereas the presence of ammonia and CO tend to decrease the free hydrogen (H) concentration and thus improve the oxidation of mercury to mercury chloride by providing higher instantaneous levels of free radical Cl. The free hydrogen may also be decreased by the reaction or combustion of hydrocarbon vapors which also provide the CO concentrations thus limiting availability of reactive H radical concentrations.

We adjust ammonia concentrations, available in the temperature range of 1005K (1,350° F.) down to 755K (900° F.), to provide maximum oxidation of mercury to mercury chloride, in the presence of CO, hydrocarbons, and sometimes NO and varying amounts of water. In this way the emissions of elemental mercury can be essentially eliminated while at the same time ammonia injection can be used for Selective Non-Catalytic Reduction (SNCR) of nitric oxide. Alternatively, ammonia can be injected independently in the zone of the furnace where the flue gas is at temperatures in the range of 1005K (1,350° F.) to 755K (900° F.) for elemental mercury emission control. Ammonia injected at this temperature range may also compliment the operation of Selective Catalytic Reduction (SCR) or various hybrid $NO_x$ removal systems although this temperature injection range is higher than normally used for SCR injection. Ammonia injection used at this temperature range also causes the oxidation of other elemental metals such as arsenic and lead which both poison the Selective Catalytic Reduction catalyst and are themselves hazardous stack gas emissions.

DESCRIPTION OF THE PREFERRED EMBODIMENTS

To explain the present process it is first necessary to provide some background information about mercury (Hg). Mercury is a metal that melts at 234K (−38° F.) and boils at 630K (674° F.). As such it can be expected to have a high vapor pressure, relative to many metals. If fact, as experienced by the hatters, the vapor pressure of mercury is sufficient to poison people who are subject to prolonged exposure. However, the oxidized forms $Hg^+$ and $Hg^{++}$, which are usually present as HgO, $HgCl_2$ or HgCl, have much lower vapor pressure. Thus, it is much easier to collect the oxidized forms that are attached to particulates with the usual particulate collecting devices than it is to collect elemental mercury (Hg) which can be in its vapor or gaseous form at flue gas temperatures.

We provide a method to control the emissions of mercury (Hg) from combustion processes. It will control the emissions of mercury by promoting the oxidization of mercury to $Hg^{++}$ or to $Hg^+$. The oxidized mercury has a much lower vapor pressure than the elemental mercury and is readily collected with the flyash. Much of the oxidized mercury is immediately absorbed by the flyash. The flyash is then collected by electrostatic precipitators, fabric filters, scrubbers or other devices. However, fabric filters, or baghouses as they are often known, will collect more of the flyash and thereby collect more of the mercury. Also this mercury oxidation process can be used with various sorbents.

In the present process we are oxidizing mercury with chlorine to $HgCl_2$, HgCl, HgO and other species, but we believe that the $HgCl_2$ is the predominate oxidized specie. We believe that HCl is the oxidizer and that the path is through atomic chlorine (Cl). The Cl concentration is dependent upon the HCl concentration the OH concentration, and the temperature as well as several other species. The reaction pathway to mercuric chloride is said by Slinger to be:

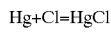

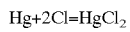

The chlorine comes from chlorides in the coal. All coal contains some chlorine but the concentration may be from 0.05 to 1.0% in UK coals. U.S. coals have lower chlorine content and are usually less than 0.3%. Powder River Basin coals typically have chlorine concentrations of 0.03%. We have observed that the mercury emissions will decrease with increasing chlorine in the coal. However, chlorine is so corrosive to metals that it would seldom be added to a combustion system for controlling mercury emissions. Some boiler operators may add sodium chloride to boilers to improve hot side electrostatic precipitator performance. However, this is seldom the practice and most operators would prefer to fire low chlorine coal.

Figure 1:
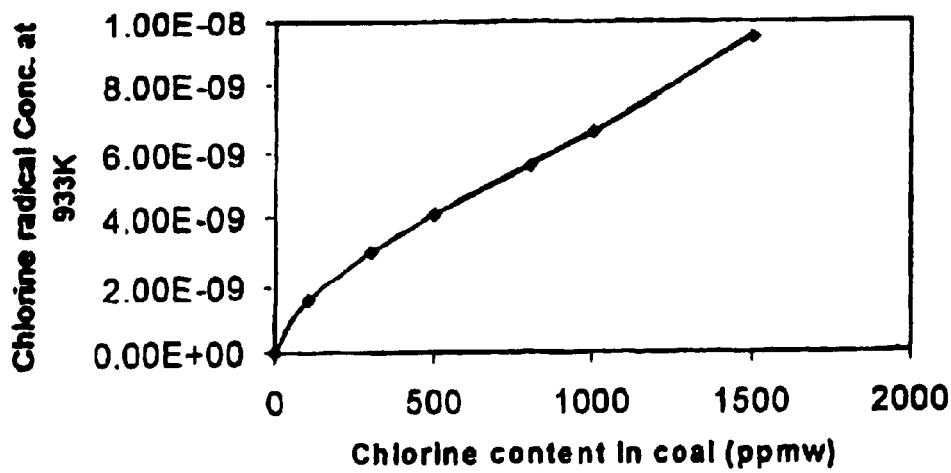
FIG. 1 is a graph showing the effect of the chlorine content in coal upon the concentration of chlorine radicals at a temperature of 933K (1220° F.).

To calculate the species concentrations at various temperatures we have used the CHEMKIN36 software library and a detailed kinetic mechanism for coal combustion flue gas reactions, comprised of 51 species and 289 reaction steps. The calculation of the concentration of Cl as a function of chlorine in the coal is shown in FIG. 1. This is for a flue gas experiencing the usual cooling path for flue gas passing through a boiler and having the typical gas concentrations, as given in FIG. 1. This is the Cl concentration at 933 K (1220° F.), which is near the upper temperature where $HgCl_2$ will form.

Figure 2:
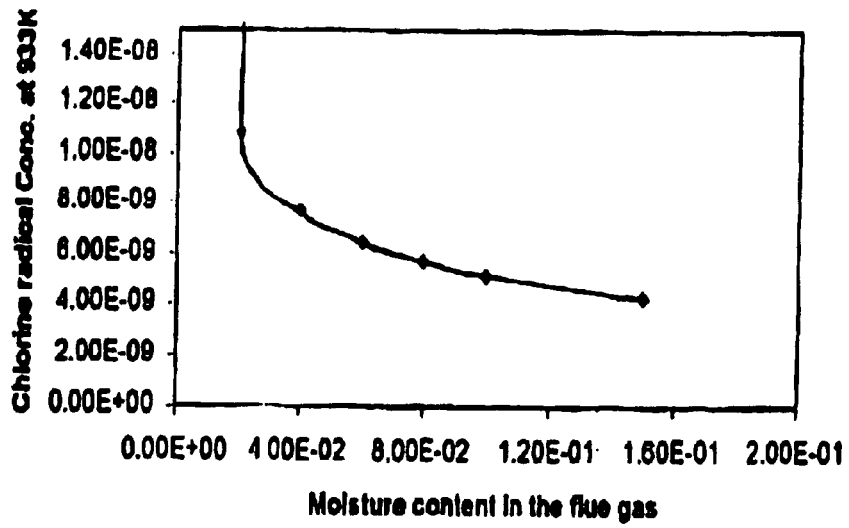
FIG. 2 is a graph showing the effect of the moisture content in flue gas upon the concentration of chlorine radicals at a temperature of 933K (1220° F.).

FIG. 1 was calculated for a flue gas containing 5.69% water vapor, written as H2O 0.0569 or 5.69E-02 in FIGS. 1 through 6. This is rather low and often flue gas might run 6–13% $H_2O$. Increasing water vapor has been calculated to suppress the formation of Cl. FIG. 2 shows the Cl concentration as a function of water vapor. The Cl increases vary rapidly as the water vapor falls below 2%. However, this level of water in flue gas is not readily attainable. In utility boiler operation it is not practical to control the concentration of water vapor.

We have now seen that for control of mercury emissions it is desirable to have high concentrations of chlorides in the coal and low concentrations of water vapor in the flue gas. We also know that it is not practical to control either one of these. There are two other species which can be controlled in the range of interest and which decrease emissions of Hg as they are increased in a limited range. They are ammonia ($NH_3$) and carbon monoxide (CO) and they both affect the Cl concentration in the temperature range of 933K where $HgCl_2$ will form. Also Hg emissions are decreased as nitric oxide (NO) concentrations are decreased. In the range of interest it is possible to decrease NO concentrations. The increases in the active specie, Cl, through the control of $NH_3$ and CO concentrations are significant.

Figure 3:
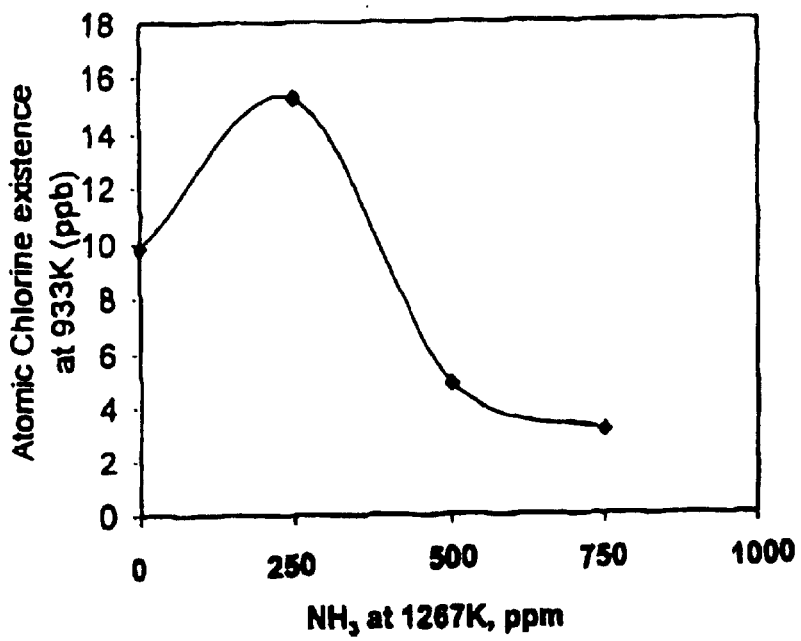
FIG. 3 is a graph showing the effect of the ammonia injection into flue gas at 1267K (1821° F.).
upon concentration of chlorine when that flue gas reaches a temperature of 933K (1220° F.).

Ammonia in limited amounts can increase the concentration of Cl in the flue gas. The temperature for oxidation of Hg is 933K (1220° F.) down to 755K (900° F.). However, Cl that is formed above this temperature reacts to form $HgCl_2$. From HCl and OH the Cl is formed. The concentration of Cl rapidly converts to HCl so the use of the Cl needs to be rapid. FIG. 3 shows the Cl concentration at 933K (1220° F.) when various amounts of $NH_3$ were added at 1267K (1821° F.) and the gas followed the same boiler cooling time history as in a typical boiler. This is for a typical flue gas of 2.5% $O_2$, 8.4% $CO_2$, 6.7% $H_2O$, 500 ppm $NH_3$ and most of the remainder $N_2$. This figure shows that the ammonia can increase the Cl concentration by 50%. However, this is accomplished by adding only 250 ppm of $NH_3$ to gas that has 500 ppm NO. This ammonia addition at 1267K (1821° F.) is typical of selective non-catalytic $NO_x$ control (SNCR). However, for good $NO_x$ control the ammonia is added at a molar ratio of about 1:1 with the NO. When urea is used for SNCR it is added at about half that ratio but since there are two $NH_2$ fragments in each urea molecule the effective $NH_3$ is the same. At molar ratios of $NH_3$ to NO of 1:1 the Cl concentration at 933K is reduced by 50%. We need a ratio of only 0.5:1 of $NH_3$ or urea to NO which is less that the 1:1 required for NO emissions control by SNCR. We also need the $NH_3$ to persist, as ammonia slip, into the lower temperature region (933K) where the $HgCl_2$ begins to form. We can use ammonia that is slip from an SNCR process. We can generate more ammonia slip by introducing the ammonia at a slightly lower temperature. Ammonia can be added at around 933K (1220° F.) or slightly higher in amounts much lower than are required for SNCR. Since little of this ammonia will react at this temperature, not much is needed.

When a selective catalytic $NO_x$ reduction process is used (SCR) the process operates at about 644K to 700K (700° F. to 800° F.) and the temperature is a bit too low for the oxidation of Hg. To control the Hg emissions, part or all of the ammonia is added at a temperature above the normal temperature for the addition of ammonia. Therefore, the Hg is oxidized through the assistance of part or all of the ammonia for the SCR process at temperatures of 933K (1220° F.) and slightly higher.

Finally, $NO_x$ emissions are sometimes controlled by a combination of SCR and SNCR processes. The combination is known as a hybrid process. In this process much or all of the ammonia is added at about 1233K (1750° F.) or slightly higher and the remainder is added just before the catalyst, which is at about 600K to 700K (620° F. to 800° F.). The ammonia that is added just before the catalyst is added at such a low temperature that it does not assist in the oxidation of Hg. However, the ammonia which is added at the high temperature and not immediately consumed does help. Too much ammonia at the reaction temperature (750K-933K) will retard the oxidation of Hg. Therefore, it is necessary to optimize the amount of ammonia added at the upper temperature as well as to find just the correct injection temperature.

Figure 4:
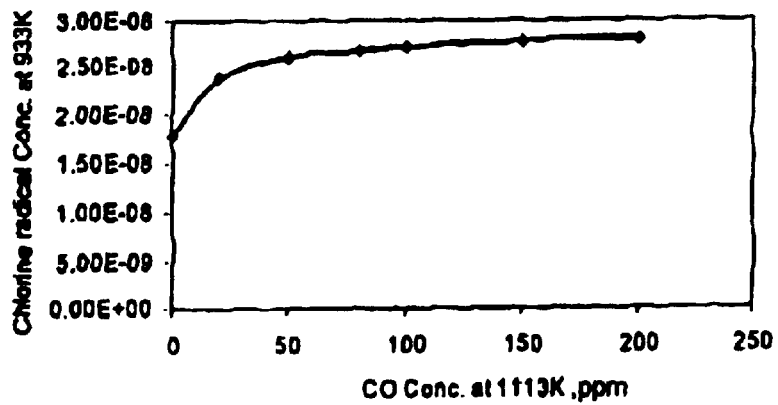
FIG. 4 is a graph showing the effect of the carbon monoxide concentration upon the concentration of chlorine radicals at a temperature of 933K (1220° F.).

Carbon monoxide (CO) increases the Cl concentration and thus the Hg oxidation. FIG. 4 shows the Cl concentration by kinetic modeling found at 933K (1220° F.) for a flue gas mixture with various CO concentrations beginning at 1113K (1543° F.). Throughout the cooling of the flue gas, the CO is being oxidized to $CO_2$ so it is important to specify the concentration and the temperature. This is for a flue gas with 14.44% $CO_2$, 5.69% $H_2O$, 3.86% $O_2$, 162 ppm HCl, and 76.59% $N_2$. It can be seen that increasing the CO from zero to 50 ppm increases the Cl from 18 to 26 ppb or almost 50%.

Figure 5:
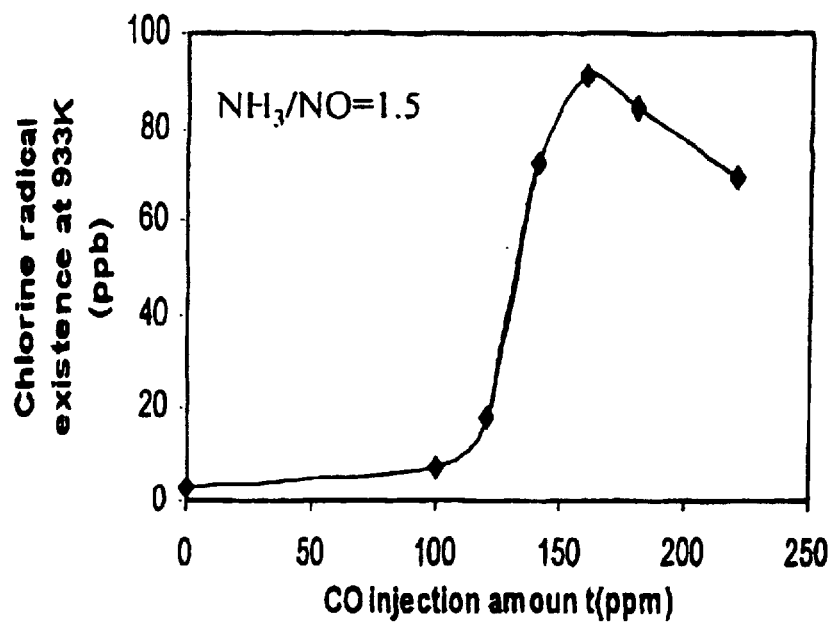
FIG. 5 is a graph showing the effect of carbon monoxide injection upon the concentration of chlorine radicals at a temperature of 933K (1220° F.).

At a higher temperature more CO is required since the CO is being oxidized throughout the flue gas cooling process. FIG. 5 shows chlorine radical (1) concentration at 933K (1220° F.) as a function of CO concentrations beginning at 1267K (1821° F.). This is for a specific $NH_3$/NO injection rate of 1.5:1. Here, at about 160 ppm CO the Cl concentration is about 20 times as much as it is at zero CO. Thus, it is seen that $NH_3$ and CO are both important to the oxidation of Hg. Both are useful and they are synergistic.

CO is very common in boilers and even in the flue gas as it exits the stack. However, it oxidizes throughout the process as the gases are cooled by the convective heat exchangers. It is usually present at the stack only if: 1) there is insufficient $O_2$ to oxidize all of the fuel; 2) there are carbon particles which continue to oxidize to CO at bulk gas temperatures which are so low that the CO is only very slowly oxidized to $CO_2$; or, 3) the mixing is poor and gas streams or even eddies contain an excess of fuel that do not mix into the oxygen rich streams until the temperatures are well below 1200K (1700° F.). In our case we would like a relatively even mixture of CO, so the addition of CO or the preservation of CO is important.

Figure 6:
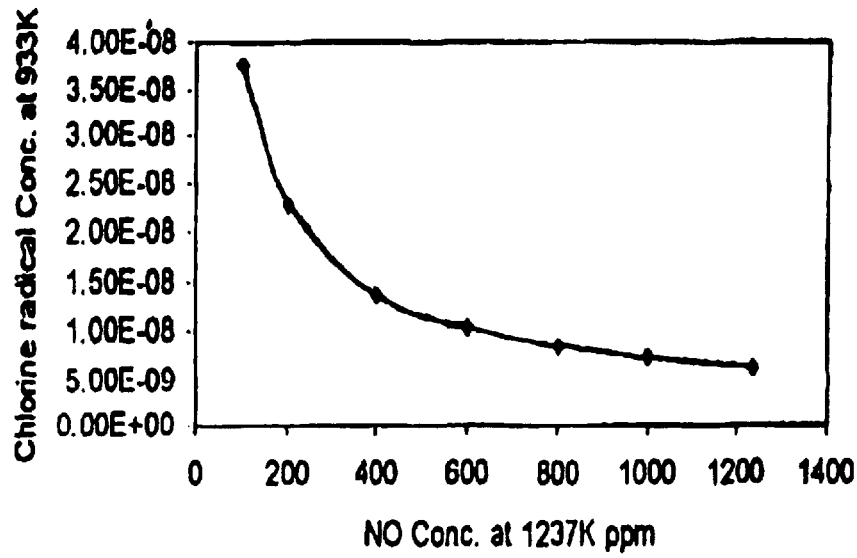
FIG. 6 is a graph showing the effect of the NO concentration upon the concentration of chlorine radicals at a temperature of 933K (1220° F.).

The NO in the flue gas limits the formation of Cl. FIG. 6 shows the chlorine radical concentration as a function of NO. The Cl concentration is given at 933K (1220° F.) and the NO concentration is given at 1237K (1767° F.). This figure clearly shows the Cl concentration more than doubling as the NO concentration is reduced from 400 to 100 ppm.

Figure 7:
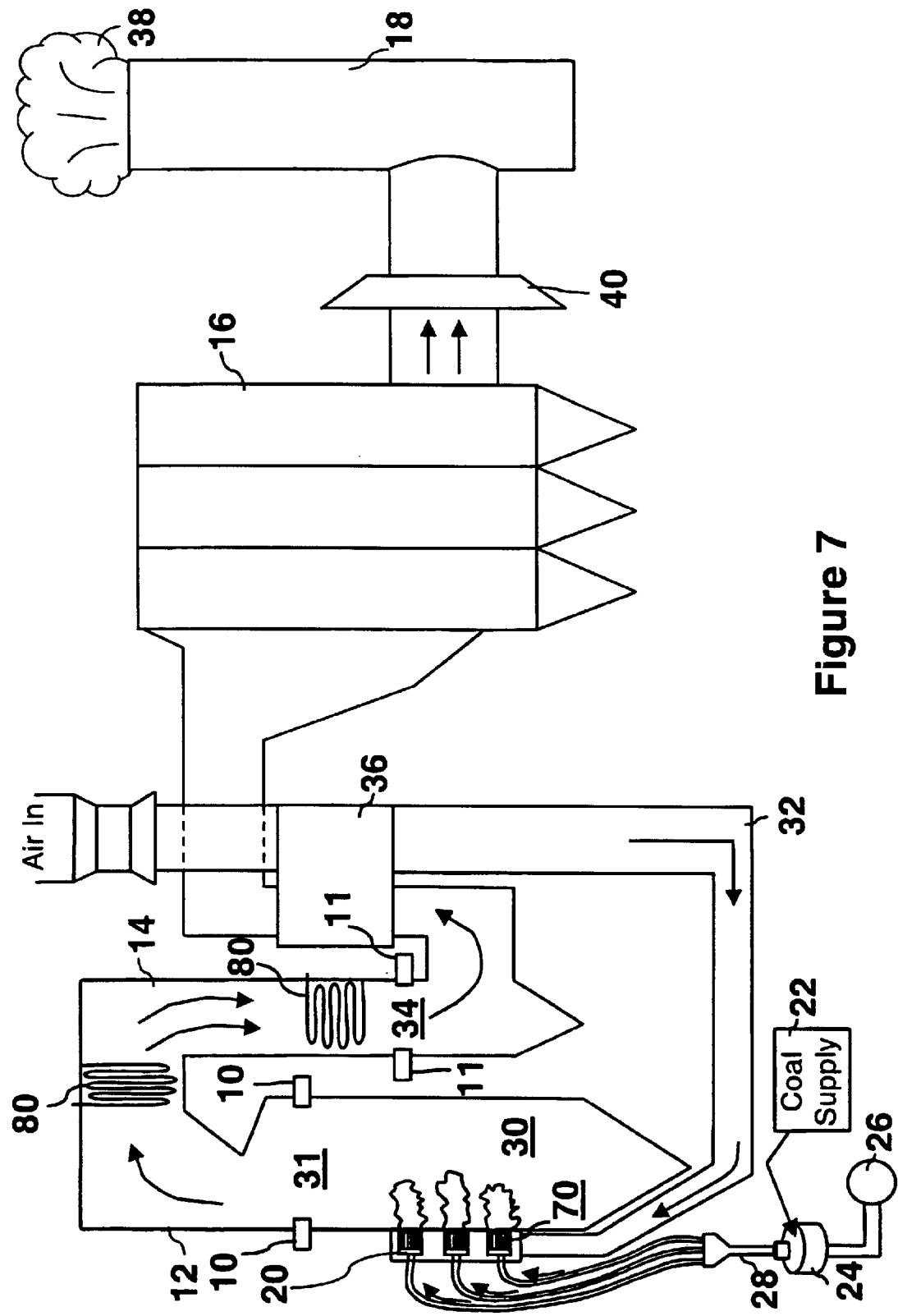
FIG. 7 is a diagram of a bottom fired furnace in which ammonia is injected to control emissions of mercury and other elemental metals.

A conventional furnace, illustrated in FIG. 7, generally includes a boiler 12, an economizer 14, an electrostatic precipitator (ESP) 16 and a stack 18. The boiler 12 includes a plurality of burners 20 typically located on the front and/or rear walls of the boiler 12. For convenience, only three burners 20 are shown in FIG. 7.

Operation of the furnace requires a supply of fuel to be burned, such as a coal supply 22. The coal supply 22 supplies coal at a predetermined rate to a pulverizer 24, which grinds the coal to a small size sufficient for burning. The pulverizer 24 receives a primary flow of air from a primary air source 26. Only one pulverizer 24 is shown, but many are required for a large boiler, and each pulverizer 24 may supply coal to many burners 20. A stream of primary air and coal is carried out of the pulverizer 24 through line 28. The primary stream of air and coal in line 28 is fed to the burner 20, which burns the fuel/air mixture in a combustion zone 30 in which the temperature exceeds 1700K (2,600° F.).

To assist in the burning, the furnace includes a secondary air duct 32 providing a secondary air flow through overfire air ports to the burner 20. Usually about 20% of the air required for optimum burning conditions is supplied by the primary air source 26. The secondary air duct 32 is used to provide the remaining air. The secondary air duct 32 brings the excess air in from the outside, and the air is heated with an air preheater 36 prior to providing the air to the burner 20.

While only three burners 20 are shown in FIG. 7, it should be understood that there are typically many more burners in a conventional furnace. Several burners may share a secondary air windbox and each burner usually has an adjustable secondary air register 70 to control the air flow to it. Each of the burners 20 burns its respective fuel/air mixture in the combustion zone 30 of the boiler 12. As the plurality of burners 20 burn their respective fuel/air mixtures in the combustion zone 30, a gaseous by-product is produced. The gaseous by-product flows in the direction of the arrows through various temperature zones out of the boiler 12, through the economizer 14, through the ESP 16 and into the stack 18 where it is exhausted to the atmosphere at 38. A fan 40 aids the flow of the gaseous by-product in this manner. The flue gas is also used to heat steam and water in convective passes 80, as is known in the art.

Some furnaces contain injectors 10 for supplying reburn fuel to the flue gas in a temperature zone 31 where temperatures may range from 1228K to 1255K (1750° F. to 2100° F.). When the flue gas reaches the inlet of the electrostatic precipitators 16 it will be at a temperature of about 450K (350° F.). We want to have ammonia and carbon monoxide present in the temperature zone 34 where the flue gas is 755K to 1005K (900° F. to 1350° F.). One way to accomplish this is to inject sufficient amounts of ammonia and possibly also inject carbon monoxide through the reburn fuel injectors 10 so that both will be present in temperature zone 34. One can also add carbon monoxide to the flue gas by biased firing the burners, or otherwise adjusting the air to fuel ratio in the initial flames, to produce sufficient carbon monoxide so that enough carbon monoxide will be in the flue gas when the flue gas passes through the second temperature zone to oxidize mercury present in the flue gas. For some fuels such as coal, the size consistency of the fuel may also be changed to change the level of carbon monoxide in the flue gas. We can, however, provide injectors 11 positioned to inject ammonia and possibly carbon monoxide into the flue gas when the gas is at the second temperature zone 34 where the temperature is 755K to 1005K (900° F. to 1350° F.). If desired one could take a sample of the flue gas from the second temperature zone and measure an amount of carbon monoxide as well as an amount of ammonia present in the flue gas. This information could then be used to determine the amounts of these additives that should be injected into the second temperature zone to achieve a desired level of removal.

Certain published data of boiler operations tends to confirm our conclusions that the presence of ammonia in the flue gas when the flue gas is at a temperature of from 755K to 1005K (900° F. to 1,350° F.) will reduce mercury emissions. It has been reported that the Becker #3 boiler in Minnesota has experienced mercury removal of less than 30% which is typical. This boiler has a wet/dry scrubber in which a water lime slurry is sprayed into the flue gas. In contrast, published data for the #3 boiler at Salem Harbor which is set forth in Table 1 below experienced a mercury removal of 82.42%. Although some have speculated that the higher removal rate at Salem Harbor #3 is attributable to Loss on Ignition we believe that the data supports our disclosure. When Loss on Ignition occurs a relatively high level of carbon particles pass through the burner into the flue gas. These particles can attract and entrap mercury and mercury compounds. Hence, it was theorized that the high mercury recovery was attributable to the presence of an unusually high content of carbon particles in the flue gas. The problem with this conclusion is that those conducting the study did not report that the burners were operating at low efficiency or that there was an unusually high particulate concentration in the flue gas. On the other hand the information that was reported supports our conclusion that mercury removal was higher because ammonia was present in the flue gas when the gas was at a temperature between 755K to 1005K (900° F. and 1350° F.) and carbon monoxide most likely was also present.

Salem Harbor Unit 3 is a pulverized coal, wall-fired boiler manufactured by Babcock & Wilcox which was installed in 1951. Nameplate generating capacity for Unit 3 is 165 MW. Unit 3 is equipped with 16 Riley Stoker low $NO_x$ burners. It is equipped with a selective non-catalytic reduction system utilizing a urea solution (1 gpm 50% urea to 18 gpm of city water) for post-combustion $NO_x$ reduction. Unit 3 fires low sulfur South American coal. The facility is equipped with a continuous emissions monitoring system (CEMS). The GEMS measures and reports opacity, $CO_2$, $SO_2$, $NO_x$ and CO levels in the exhaust gas. The CEMS data is also used to control the injection rate of urea. Unit 3 is equipped with an electrostatic precipitator system for the control of particulate emissions. The precipitator was manufactured by Research-Cottrell. The flue gas from Unit 3 flows from the economizer outlet to the precipitator and then to the 445 foot tall exhaust stack.

During a test program, Unit 3 was operating at a "steady-state" load condition throughout each test run. The steady-state load represented the maximum capacity (+/−5%) of the source being tested. Measurements of particle bound mercury, oxidized mercury and elemental mercury were made at the inlet of the electrostatic precipitator (ESP) and at the exhaust stack or outlet of the ESP four times. The results of these measurements are set forth in Table 1. From these results removal efficiencies were also determined as reported in Table 1.

TABLE 1

MERCURY EMISSIONS DATA AND REMOVAL EFFICIENCIES

| Component | Test 1 | Test 2 | Test 3 | Test 4 | Average |
|---|---|---|---|---|---|
| Measured At ESP Inlet (in mg/hr) | | | | | |
| Particle Bound Hg | 1,978 | 2,333 | 1,902 | 1,932 | 1,938 |
| Oxidized Hg | 156 | 78 | 22 | 29 | 69 |
| Elemental Hg | <308 | <392 | <148 | <151 | <202 |
| Total Hg | <2,442 | <2,713 | <2,072 | <2,112 | <2,209 |
| Measured at ESP Exhaust Stack | | | | | |
| Particle Bound Hg | 32.07 | 41.33 | 48.79 | 37.44 | 39.43 |
| Oxidized Hg | 128.28 | 79.71 | 34.44 | 37.44 | 66.72 |
| Elemental Hg | <250.72 | <245.04 | <149.25 | <138.25 | <179.41 |
| Total Hg | <411.06 | <366.09 | <232.48 | <213.14 | <285.56 |
| Inlet/Outlet Removal Efficiency % | | | | | |
| Particle Bound Hg | 98.28 | 98.23 | 97.43 | 98.96 | 97.96 |
| Oxidized Hg | 17.68 | * | * | * | * |
| Elemental Hg | 18.56 | 18.92 | * | 8.39 | 8.62 |
| Total Hg | 83.17 | 86.51 | 88.78 | 89.71 | 87.28 |

*Increase observed.

The average removal efficiency of 87.28% is significant because the electrostatic precipitators removed most of the mercury passing through them. This occurred because most of the mercury was particle bound and the electrostatic precipitators removed nearly all the particles. Such binding could only have occurred if the mercury was oxidized. It therefore appears that the addition of urea provided sufficient ammonia within the temperature zone of 755K to 1005K (900° F. and 1350° F.) allow such oxidation.

We have shown that the Cl which oxidizes the Hg is increased by more Cl in the coal, less water and less NO in the flue gas and by small amounts of $NH_3$ and CO in the flue gas. The $NO_x$ $NH_3$, and CO can be controlled.

Because Cl also oxidizes with other elemental metals a similar result could be expected for removal of many other metals such as chromium, arsenic, selenium, cadmium, and lead. Arsenic, selenium, cadmium, and lead are toxic and chromium six is toxic so it is desirable to limit the emissions of these metals and there compounds. Most of these metals are vaporized with iron from steel making electric furnaces. They are collected as oxides and resulting mix is a hazardous waste. To separate these, the materials are heated by a fuel rich fire and all but the iron are vaporized as the elemental metals. The iron oxide is separated as a molten slag which is no longer toxic and then with the addition of more air the hot metals are oxidized and the less volatile oxides are collected by a baghouse or ESP as a valuable commodity. Thus, it seen that these are less volatile when they are oxidized. Many of these metals are emitted from power plant stacks in proportions in excess of their proportions to iron, aluminum, silicon, sodium, and other metals in the coal. Therefore, these metals can well be expected to be more completely retained in the collected flyash when they can be further oxidized by the Cl which we are maximizing. Consequently, the process as described in the context of removing mercury is also useful for removing many other metals from flue gas.

While the present invention has been described with particular reference to the drawings, it should be understood that the invention is not limited to the preferred embodiments here disclosed but may be variously embodied within the scope of the following claims.

We claim:

1. A method of removing mercury from flue gas produced by combustion devices burning mercury and chlorine containing fuel, the flue gas containing particles and passing from a combustion zone in which the temperature exceeds 2600° F., through a first temperature zone in which the temperatures range from 1750° F. to 2100° F., through a second temperature zone in which the temperatures range from 900° F. to 1350° F. and through a particle removal device, the method comprising introducing ammonia into the flue gas when the flue gas passes through the second temperature zone, the ammonia being introduced in sufficient amounts to increase concentration of atomic chlorine in the second zone such that the chlorine will bond with mercury within the flue gas in the second temperature zone.

2. The method of claim 1 also comprising adding carbon monoxide to the flue gas.

3. The method of claim 2 in which the ammonia is introduced and the carbon monoxide is added by injecting urea into the flue gas such that ammonia and carbon monoxide are formed from the urea, wherein the urea is added to the flue gas stream at the second temperature zone and is added in sufficient amounts to increase concentration of atomic chlorine in the second temperature zone such that the chlorine will bond with mercury within the flue gas in the second temperature zone.

4. The method of claim 2 wherein the fuel is burned in a burner to produce initial flames and the carbon monoxide is added to the flue gas by adjusting air to fuel ratio in the initial flames in a manner to produce sufficient carbon monoxide so that enough carbon monoxide will be in the flue gas when the flue gas passes through the second temperature zone to increase concentration of atomic chlorine in the second temperature zone such that the chlorine will bond with mercury present in the flue gas in the second temperature zone.

5. The method of claim 2 wherein the fuel is burned in a burner and the carbon monoxide is added to the flue gas by careful control of the size consistency of the fuel fired in the furnace to produce sufficient carbon monoxide so that enough carbon monoxide will be in the flue gas when the flue gas passes through the second temperature zone to increase concentration of atomic chlorine in the second temperature zone such that the chlorine will bond with mercury present in the flue gas in the second temperature zone.

6. The method of claim 2 wherein the fuel is burned in a burner and the carbon monoxide is added to the flue gas by biased firing to the burners to produce sufficient carbon monoxide so that enough carbon monoxide will be in the flue gas when the flue gas passes through the second temperature zone to increase concentration of atomic chlorine in the second temperature zone such that the chlorine will bond with mercury present in the flue gas in the second temperature zone.

7. The method of claim 1 wherein the ammonia is added to the flue gas prior to passage of the gas through the second temperature zone, the ammonia being added in sufficient amounts so that enough ammonia will be present in the flue gas when the flue gas reaches the second temperature zone to increase concentration of atomic chlorine in the second temperature zone such that the chlorine will bond with mercury within the flue gas in the second temperature zone.

8. The method of claim 1 also comprising taking a sample of the flue gas from the second temperature zone and measuring an amount of carbon monoxide present in the flue gas.

9. The method of claim 1 also comprising injecting a gaseous or gas producing hydrocarbon fuel into the flue gas before the flue gas enters the second temperature zone.

10. The method of claim 1 wherein the temperatures in the second temperature zone are greater than 1000° F. and not greater than 1350° F.

11. A method of removing metals from flue gas produced by combustion devices burning fuel containing those metals and chlorine the flue gas containing particles and passing from a combustion zone in which the temperature exceeds 2600° F., through a first temperature zone in which the temperatures range from 1750° F. to 2100° F., through a second temperature zone in which the temperatures range from 900° F. to 1350° F. and through a particle removal device, the method comprising introducing a material into the flue gas that controls free radical Cl when the flue gas passes through the second temperature zone in sufficient amounts to increase concentration of atomic chlorine in the second temperature zone such that the chlorine will bond with the metals within the flue gas in the second temperature zone.

12. The method of claim 11 wherein the metals are selected from the group consisting of chromium, arsenic, selenium, cadmium, mercury, and lead.

13. The method of claim 12 wherein the material is a material selected from the group consisting of ammonia, urea, hydrochloric acid and carbon monoxide.

14. A method of removing metals from flue gas produced by combustion devices burning fuel containing metals and chlorine, the flue gas containing particles and passing from a combustion zone in which the temperature exceeds 2600° F., through a first temperature zone in which the temperature ranges from 1750° F. to 2100° F., through a second temperature zone in which the temperatures range from 900° F. to 1350° F. and through a particle removal device, the method comprising introducing a material into the flue gas that affects the flue gas in a manner to optimize Cl oxidation of elemental metals in the second temperature zone.

15. The method of claim 14 wherein the metals are selected from the group consisting of chromium, arsenic, selenium, cadmium, mercury, and lead.

16. The method of claim 14 wherein the material is a material selected from the group consisting of ammonia, urea, hydrochloric acid and carbon monoxide.

* * * * *